United States Patent [19]
Tanaka

[11] Patent Number: 5,943,948
[45] Date of Patent: Aug. 31, 1999

[54] TOASTER CAPABLE OF TOASTING A SLICE OF BREAD WITH A FINE PATTERN

[75] Inventor: Toshio Tanaka, Nara, Japan

[73] Assignees: Sanyo Electric Co., Ltd., Osaka; Sanyo Home Tech Co., Ltd., Kyoto, both of Japan

[21] Appl. No.: 09/015,631

[22] Filed: Jan. 29, 1998

[30] Foreign Application Priority Data

Jun. 6, 1997 [JP] Japan ................................. 9-149685

[51] Int. Cl.⁶ ...................................................... A47J 37/08
[52] U.S. Cl. .............................. 99/388; 99/391; 99/401
[58] Field of Search ........................... 99/388, 385, 389, 99/391, 401

[56] References Cited

U.S. PATENT DOCUMENTS

| | | |
|---|---|---|
| 2,147,388 | 2/1939 | Serota .................................... 99/388 |
| 2,160,771 | 5/1939 | Wertzheiser ............................. 99/388 |
| 2,483,669 | 10/1949 | Reid ..................................... 99/388 X |
| 4,656,927 | 4/1987 | Mosby et al. ........................... 99/388 |
| 5,156,637 | 10/1992 | Wai-Ching ............................. 99/388 |

*Primary Examiner*—Reginald L. Alexander
*Attorney, Agent, or Firm*—Armstrong, Westerman, Hattori, McLeland & Naughton

[57] ABSTRACT

In a toaster for toasting a sliced bread with a pattern of a pattern plate, a heater guard is attached to the pattern plate on the side of the sliced bread, and the heater guard has a protrusion over the length between the upper and lower portions of the pattern plate generally in the shape of a rectangle with one side opened such that a prescribed space is ensured between the heater guard and the pattern plate. Thus, a pattern caused by the shadow of the heater guard is not formed in the pattern of the toasted sliced bread, and a toaster allowing a fine toasting pattern can be obtained.

9 Claims, 3 Drawing Sheets

TOASTER CAPABLE OF TOASTING A SLICE OF BREAD WITH A FINE PATTERN

BACKGROUND OF THE INVENTION

1. Field of the Invention

The present invention relates to a toaster for toasting a slice of bread.

2. Description of the Background Art

Generally, a so-called pop-up toaster has a roasting chamber with a slot on its upper surface and heats a sliced bread inserted from the slot with a pair of heaters. Among such pop-up toasters, a certain type of toaster is available in which a pattern plate in the shape of animal, flower or the like is fixed to a heater guard on a heater, so that a sliced bread can be toasted with the pattern on the surface thereof.

FIGS. 1 and 2 show the structure in which a conventional pattern plate is attached. FIG. 1 is a front view and FIG. 2 is a side view. A pattern hole 2 is punched by pressing in a pattern plate 1 made of a metal thin plate, so that a sliced bread can be browned with a pattern by heat from a heater. A heater guard 3 is made of a wire and provided perpendicularly along the heater. Pattern plate 1 is attached to that side of heater guard 3 which faces the sliced bread and secured thereto by fixing a holding portion 4 to heater guard 3.

In the conventional toaster, however, heater guard 3 and pattern plate 1 are almost flush where heater guard 3 passes pattern hole 2. As a result, the pattern on the toasted sliced bread may disadvantageously include an undesired line caused by a shadow of heater guard 3, thereby marring a desired pattern.

In addition, as pattern plate 1 is retained by fixing holding portion 4 to heater guard 3, fixing of holding portion 4 may become loose due to heat expansion by heat from the heater, vibration and sliding when the sliced bread is inserted or removed. In such case, the mounted position of pattern plate 1 may be displaced, causing mispositioning of the pattern on the sliced bread.

Moreover, pattern plate 1 protrudes toward the side of the sliced bread by its thickness as it is attached to that side of heater guard 3 which faces the sliced bread. Thus, the sliced bread may be caught by the upper end of the pattern plate 1 as it is inserted into a roasting chamber, preventing smooth insertion of the sliced bread.

SUMMARY OF THE INVENTION

The present invention relates to a toaster and made to solve the aforementioned problems. It is an object of the present invention to provide a toaster capable of toasting a sliced bread with a fine pattern.

It is another object of the present invention to provide a toaster preventing displacement in position of a pattern on a sliced bread.

It is still another object of the present invention to provide a toaster allowing smooth insertion of a sliced bread.

To achieve the aforementioned objects, according to one aspect of the present invention, a toaster is provided in which a pair of heater plates with a guard are provided spaced apart in a roasting chamber and a pattern plate is mounted to the guard for toasting a sliced bread inserted between the pair of heater plates with a pattern of the pattern plate. In the toaster, the pattern plate is attached to the guard on the side of the sliced bread, and the guard has a protrusion which protrudes generally in the shape of a rectangle with one side opened over a length between upper and lower ends of the pattern plate.

According to the above mentioned structure, a shadow of the heater guard passing a pattern hole would not be cast on the sliced bread as the guard is spaced apart from the sliced bread.

More preferably, the pattern plate is formed of a thin plate in which an arbitrary pattern hole is formed by punching, and a holding portion for retaining the pattern plate to the guard is integrally formed with the edge of the pattern hole.

According to the above mentioned structure, the pattern on the sliced bread would not be marred by the holding portion.

More preferably, the holding portions of the pattern plate are retained at both ends of the protrusion of the guard.

According to the above described structure, the pattern plate never moves on the heater guard as the holding portion abuts against the protrusion.

More preferably, the upper end of the pattern plate is bent toward the guard.

According to the above described structure, as the upper end of the pattern plate is bent toward the heater guard, the inserted sliced bread can be guided by the bending portion and smoothly inserted into the roasting chamber.

According to another aspect of the present invention, in an apparatus for forming a pattern for a toaster including a heater guard and a pattern plate attached thereto, the heater guard and the pattern plate are spaced apart by a prescribed distance so that a pattern caused by a shadow of the heater guard is not formed on a sliced bread.

According to still another aspect of the present invention, a toaster includes a heater for heating a sliced bread, means for browning the sliced bread with a pattern, and a heater guard for providing a space between the heater and the sliced bread, where the heater guard is bent so that a pattern caused by a shadow of the heater guard is not formed on the sliced bread.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
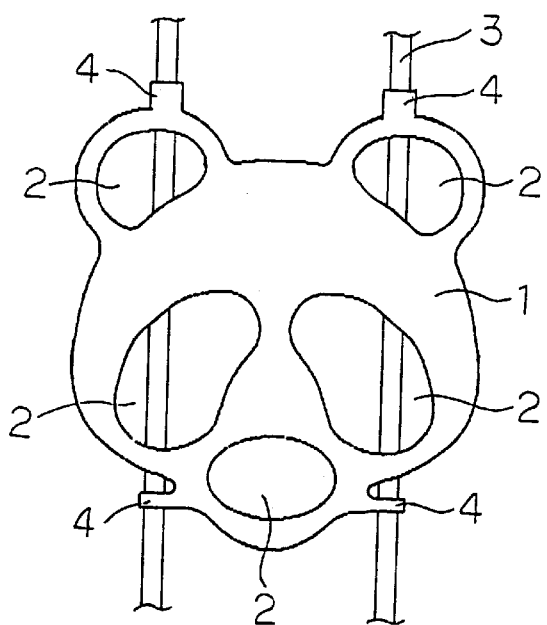
FIG. 1 is a front view of a conventional pattern plate.
Figure 2:
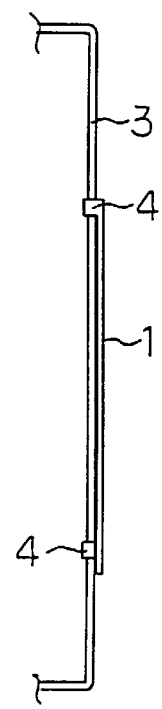
FIG. 2 is a side view of the pattern plate shown in FIG. 1.
Figure 3:
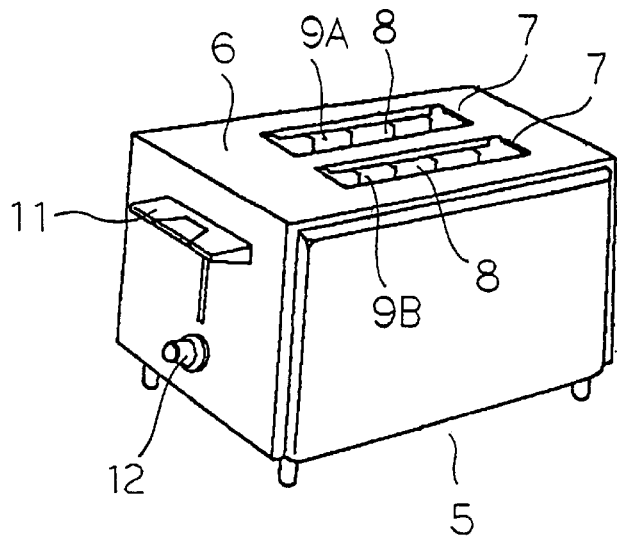
FIG. 3 is a perspective view showing a toaster in accordance with an embodiment of the present invention.
Figure 4:
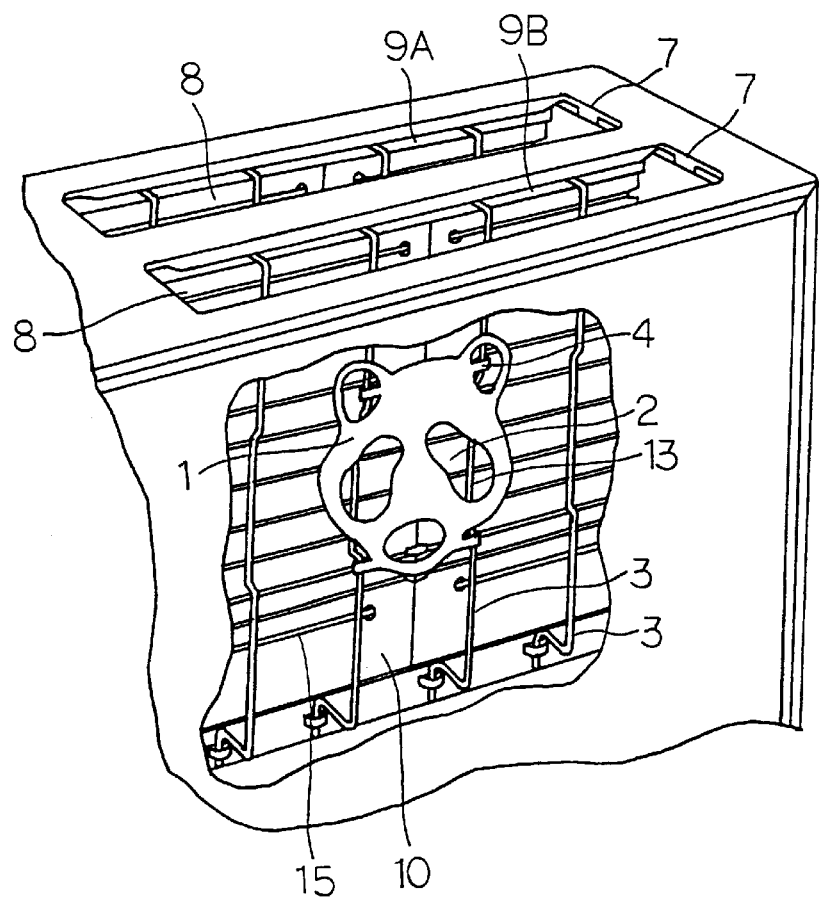
FIG. 4 is a partially cutaway perspective view showing the toaster in FIG. 3.
Figure 5:
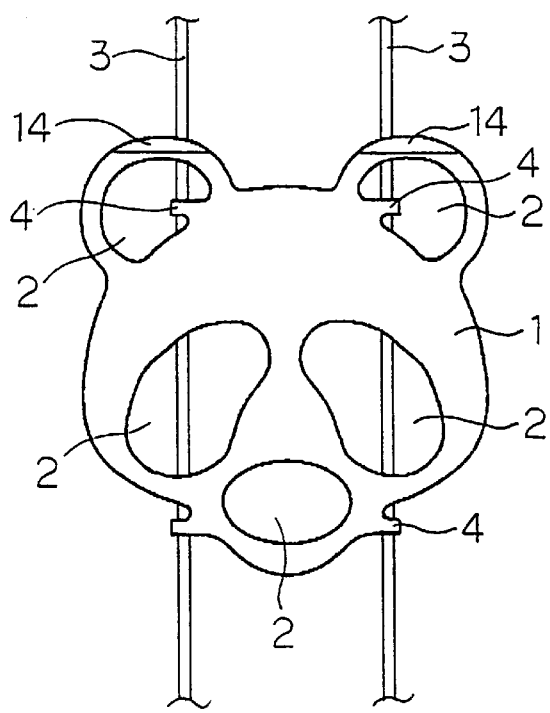
FIG. 5 is a front view of a pattern plate 1 shown in FIG. 4.
Figure 6:
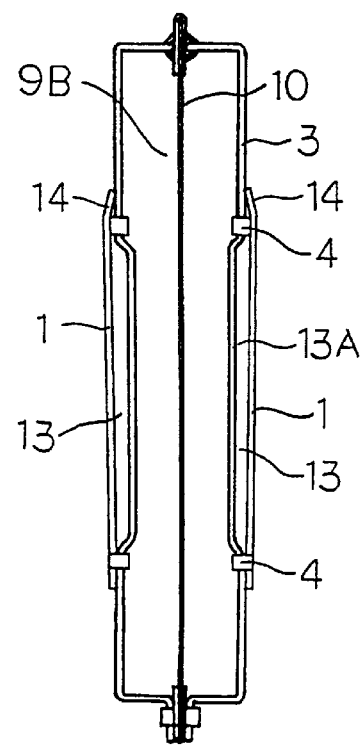
FIG. 6 is a side view of the pattern plate shown in FIG. 5.

Referring to FIGS. 3 to 6, a toaster in accordance with an embodiment of the present invention will now be described in detail.

In FIGS. 3 to 6, two slots 7 for introducing a slice of bread (a sliced bread) are formed in an upper plate 6 of a toaster body 5.

A heater 9A and a middle heater 9B are provided on opposite sides of a roasting chamber 8 positioned below slot 7 for toasting either side of the sliced bread inserted from slot 7. Heaters 9A and 9B include a heater plate 10 formed of a mica plate and a nichrome wire 15 wound on heater plate 10. Middle heater 9B located between two slots 7 is commonly used in left and right roasting chambers 8.

A lever 11 operates an elevator (not shown) for bringing up and down the sliced bread inserted from slot 7. Toasting color of the sliced bread can be controlled by rotating a toasting control knob 12.

Heater guards 3, which are perpendicularly provided mutually spaced apart by a prescribed distance on a front surface of the heater, have their upper ends fixed to the upper portions of heaters 9A and 9B and their lower ends inserted into bent portions in the lower portion of heaters 9A and 9B.

Approximately in middle of heater guards 3, protrusions 13 are formed which are bent and protruding toward the side of heaters 9A and 9B, generally in the shape of a rectangle with one side opened.

Pattern plate 1 is formed of a single metal plate such as a stainless plate, and has an arbitrary pattern hole 2 punched out by pressing in the shape of a letter, character, symbol or the like. Holding portions 4 for fixing pattern plate 1 to heater guards 3 are formed integrally with and projecting from pattern plate 1 at the edge of pattern hole 2 and the lower edge of pattern plate 1. Pattern plate 1 is attached to heater guards 3 on the side facing the sliced bread and placed close to the surface of the sliced bread when the sliced bread is set into roasting chamber 8. Further, pattern plate 1 is placed over protrusions 13 of heater guards 3 and secured by fixing holding portions 4 at portions outer than the upper and lower ends of protrusions 13, so that a prescribed space is formed between a bottom portion 13A of protrusion 13 and pattern plate 1 (more specifically, between bottom portion 13A of the protrusion and pattern hole 2). Thus, by fixing holding portions 4 to both ends of protrusions 13, holding portions 4 are engaged with protrusions 13, preventing movement of pattern plate 1.

At the upper end of pattern plate 1, an inclined portion 14 is provided which is bent toward a heater guard 3. This allows the sliced bread inserted into roasting chamber 8 to be guided by inclined portion 14 and smoothly inserted without being caught by pattern plate 1. As a result, the width of roasting chamber 8 can be reduced so that pattern plate 1 more readily comes close to the surface of the sliced bread, thereby improving a finished pattern toasted on the sliced bread.

The operation of the toaster according to the embodiment will now be described.

After the sliced bread is inserted into slot 7 and toasting color is controlled by toasting control knob 12, when lever 11 is pushed down to set the elevator in a lower stage position, the electric current responsively flows through heaters 9A and 9B to start toasting of the sliced bread. As soon as the electric current starts flowing through heaters 9A and 9B, the surface of the sliced bread is heated by radiation from heaters 9A and 9B. At the time, as heat from the heater is shut off in the portion close to pattern plate 1, the sliced bread can be toasted with a desired pattern on its surface. Though heat from heaters 9A and 9B is shut off by heater guards 3 where heater guards 3 are passing pattern holes 2, a space is ensured between the surface of the sliced bread and heater guards 3 as heater guards 3 and pattern plate 1 are spaced apart. Thus, heat from the heater can readily reach the sliced bread not intercepted by heater guards 3 and the shadows of heater guards 3 are made faint, whereby any undesired line on the toasted pattern of the sliced bread can be avoided.

After a prescribed period of time, the electric current to heaters 9A and 9B is stopped, and simultaneously the elevator moves to an upper stage position to complete toasting of the sliced bread.

As in the forgoing, in the present invention, the heater guards are provided with protrusions such that a prescribed space is ensured between pattern plate 1 and heater guards 3, whereby any undesired shadow of the heater guard on the pattern toasted on the sliced bread is avoided. Thus, a toaster allowing formation of a fine pattern can be provided.

In addition, integrally forming the holding portion with the edge of pattern hole 2 eliminates the need for cutting away a portion of the pattern plate solely for forming the holding portion. Thus, the pattern plate is effectively utilized while preventing deterioration of the pattern.

Furthermore, fixing the holding portions to both ends of protrusions 13 of the heater guards allows holding portions 4 to be engaged with protrusions 13. Thus, movement of pattern plate 1 is prevented. Therefore, the pattern is not displaced in position on the sliced bread.

Moreover, inclined portion 14 which is inclined toward the guards at the upper end of pattern plate 1 allows the sliced bread inserted into the roasting chamber to be guided by the inclined portion and smoothly inserted without being caught by pattern plate 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A toaster including a pair of heater plates with a guard provided opposite to and spaced from each other in a roasting chamber, and a pattern plate attached to the guard for toasting, while forming a pattern by the pattern plate, a slice bread inserted between said pair of heater plates, wherein said pattern plate is attached on that side of said guard that faces the sliced bread, and said guard is provided with a protrusion extending generally in a shape of a rectangle with one side opened over a length from upper to lower end of said pattern plate such that a prescribed space is ensured between said guard and said pattern plate and the upper end of said pattern plate is bent toward said guard.

2. The toaster according to claim 1, wherein said pattern plate is formed of a thin plate in which an arbitrary pattern hole is punched out, and a holding portion for retaining said pattern plate to said guard is integrally formed with an edge of said pattern hole.

3. The toaster according to claim 1, wherein the holding portions of said pattern plate are retained at both ends of the protrusions of said guards.

4. The toaster according to claim 2, wherein the holding portions of said pattern plate are retained at both ends of the protrusion of said guard.

5. An apparatus for forming a pattern for a toaster including a heater guard and a pattern plate attached thereto, wherein
   said heater guard and said pattern plate are spaced apart by a prescribed space so as to prevent formation of a pattern caused by a shadow of said heater guard on a slice bread and,
wherein an end on that side of said pattern plate from which a sliced bread is inserted is bent toward said heater guard.

6. The apparatus according to claim 5, wherein said heater guard is bent apart from said pattern plate.

7. The apparatus according to claim 6, wherein said pattern plate is fixed to said bent portion.

8. The apparatus according to claim 5, wherein said pattern plate includes a pattern hole and said heater guard is spaced apart by a prescribed space from said pattern plate at least at a portion of said pattern hole.

9. A toaster with the apparatus according to claim 5.

* * * * *